(12) United States Patent
Krause

(10) Patent No.: US 11,902,447 B2
(45) Date of Patent: Feb. 13, 2024

(54) BLOCKCHAIN SECURED BY BACKWARD CHAINED ELEMENTS

(71) Applicant: BLOCKCHAIN SYSTEMS PTE. LTD., Singapore (SG)

(72) Inventor: Georg Krause, Singapore (SG)

(73) Assignee: BLOCKCHAIN SYSTEMS PTE. LTD., Singapore (SG)

(*) Notice: Subject to any disclaimer, the term of this patent is extended or adjusted under 35 U.S.C. 154(b) by 474 days.

(21) Appl. No.: 17/288,541

(22) PCT Filed: Nov. 21, 2019

(86) PCT No.: PCT/SG2019/050569
§ 371 (c)(1),
(2) Date: Apr. 25, 2021

(87) PCT Pub. No.: WO2020/106219
PCT Pub. Date: May 28, 2020

(65) Prior Publication Data
US 2021/0391997 A1 Dec. 16, 2021

(30) Foreign Application Priority Data
Nov. 21, 2018 (SG) .............................. 10201810416Y

(51) Int. Cl.
*H04L 9/32* (2006.01)
*H04L 9/00* (2022.01)
(Continued)

(52) U.S. Cl.
CPC ........... *H04L 9/3239* (2013.01); *G06Q 50/18* (2013.01); *H04L 9/3247* (2013.01);
(Continued)

(58) Field of Classification Search
CPC ....... H04L 9/3239; H04L 9/3247; H04L 9/50; H04L 67/1097; H04L 2209/56;
(Continued)

(56) References Cited

U.S. PATENT DOCUMENTS 9,374,373 B1 6/2016 Fai
10,805,067 B1 * 10/2020 Griffin .................. H04L 9/0637
(Continued)

FOREIGN PATENT DOCUMENTS

CN 107169764 9/2017
CN 108599963 9/2018

*Primary Examiner* — Vu V Tran
(74) *Attorney, Agent, or Firm* — Adam Warwick Bell

(57) ABSTRACT

Method to create trust for blockchains without the need for Proof-of-Work and without the need for multiple contributing nodes. The method comprises one or more, backward chained elements in each block. These elements have a one-way property from the current block to the previous block. The invention can be implemented in Hardware, Software or in a combination of both. Embodiments of the back-step blockchain comprise existing blockchain applications and new blockchain application where speed or physical size or network independency are desired properties. One, but not the only embodiment is the implementation of the back-step blockchain into smartphones.

19 Claims, 6 Drawing Sheets

(51) Int. Cl.
*H04L 9/40* (2022.01)
*G06Q 50/18* (2012.01)
*H04L 67/1097* (2022.01)
*G06F 21/64* (2013.01)

(52) U.S. Cl.
CPC ............ *H04L 67/1097* (2013.01); *H04L 9/50* (2022.05); *H04L 2209/56* (2013.01)

(58) Field of Classification Search
CPC ... H04L 63/0823; H04L 63/123; G06Q 50/18; G06F 21/64
See application file for complete search history.

(56) References Cited

U.S. PATENT DOCUMENTS

2018/0219669 A1* 8/2018 Chen ..................... H04L 9/0891
2021/0089676 A1* 3/2021 Ford ..................... H04L 9/0825

\* cited by examiner

Backstep Blockchain at Financial Institution
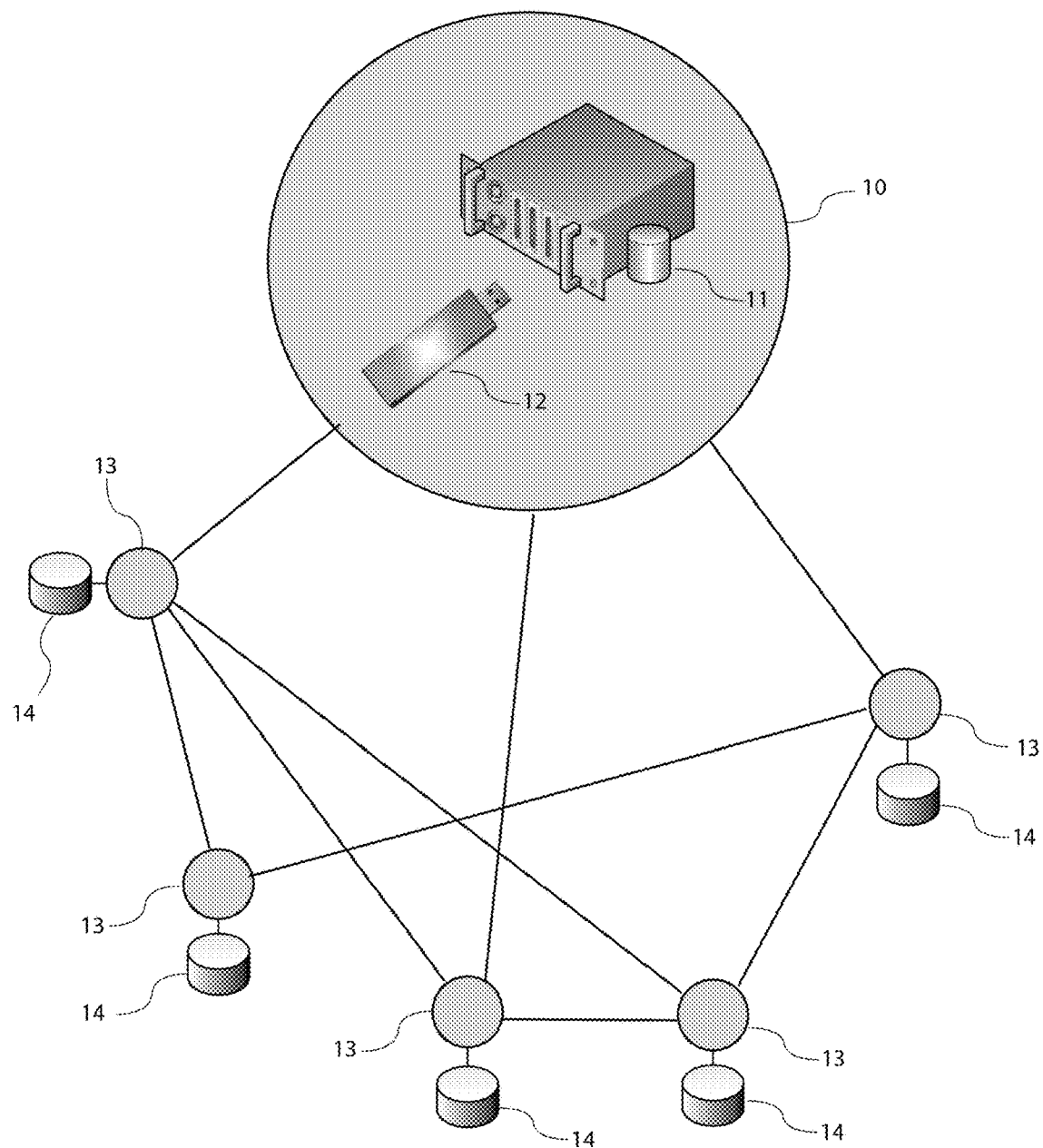
Figure: 1

Functional Flow Overview
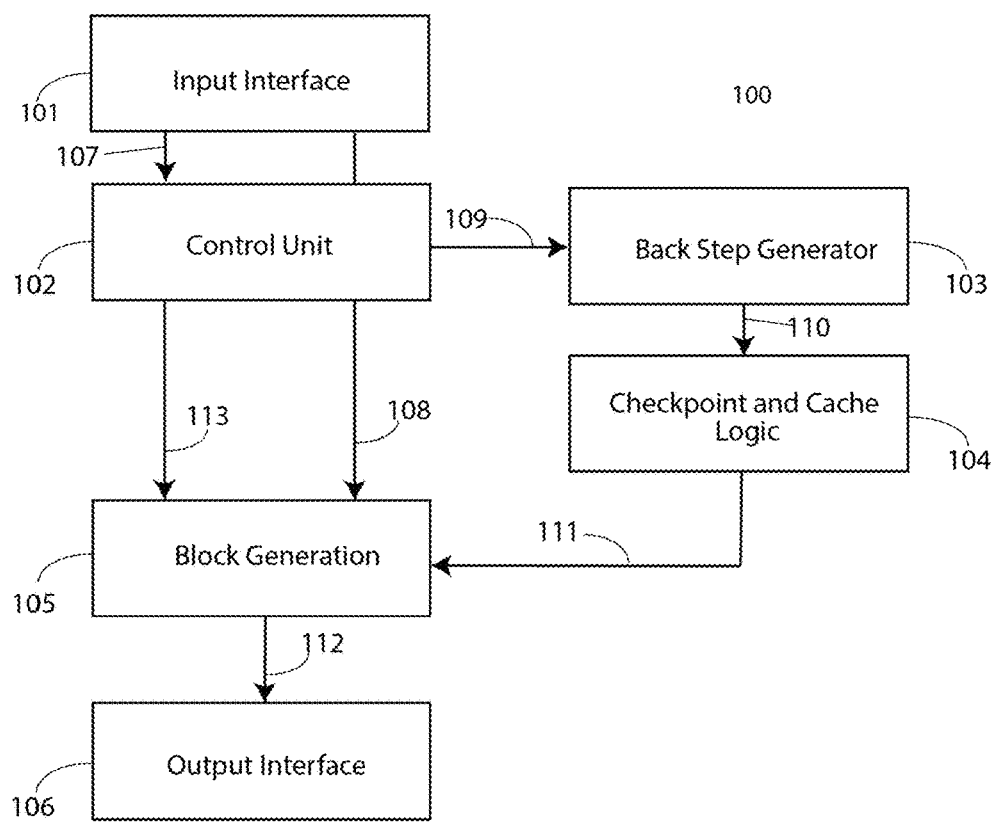
Figure 1.1

Seal Value Delivery

BLOCKCHAIN SECURED BY BACKWARD CHAINED ELEMENTS

BACKGROUND OF THE APPLICATION

Field of the Application

The application belongs to the field of electronic secure ledger.

Discussion of Related Art

Any discussion of the prior art throughout the specification should in no way be considered as an admission that such prior art is widely known or forms part of common general knowledge in the field.

There is currently no feasible technology known that prevents manipulation of data on a storage device itself. Read only devices can be read and written with manipulated data onto another device. Blockchains claim to solve this problem by using technologies that can detect manipulated copies or make it highly unlikely that such copies can be produced.

Current blockchains are based on the mathematical one-way property of the hash function, allowing to calculate easily into one direction, but it is mathematically hard to calculate the reverse direction. It is practically impossible. It is also practically impossible to construct two different inputs, which result in the same hash result. A hash is seen as a cryptographic fingerprint of the input data. Current blockchains use different implementations of hash algorithms, but they all provide the mentioned properties.

Blockchains are linked-list data structures in form of blocks or records, where each new block contains the result of a cryptographic hash function of the previous block. This creates the link.

The result is a chain of blocks, where each block depends on all the previous blocks. Manipulation of a previous block is seen at all future blocks by different hash values. Following the chain of blocks by recalculating the hash for each block provides an easy way to detect manipulation of past blocks. To be able to prevent the change of the previous records several methods are currently available, but they have all specific disadvantages. Current blockchains contain often a hash of the actual payload instead of the actual payload. All known blockchains contain additional, so called metadata in the block. As an example, are block number and time stamps mentioned.

Manipulating an earlier block in the chain means that all following blocks need also to be recalculated, because the hash value will change for all the following blocks. Current known implementations make such a recalculation hard or at least easy detectable.

Many blockchains use for this purpose large number of nodes in a network. Creating a manipulated chain becomes more difficult with the growing number of nodes in such a network. Examples are technologies like directed acyclic graphs DAG and Bayesian networks.

Proof-of-Work is also known as a technology for blockchains. Here, the forward calculation of the hash is loaded with additional computational work. The original calculation of such a chain is so much more difficult, that the workload requires to be distributed to many computational nodes. All nodes apply the same algorithm with some modification of the input data. The nodes compete to each other. Statistically after a time one node finds a required result and distributes it to the other nodes. It is then placed into all copies of the blockchain at all nodes. The work of the nodes that did not reach the result is wasted. This technique is widely used in Bitcoin and others but has the drawback of huge waste of energy.

Recalculation of a manipulated chain would require the same amount of work for every step from the manipulation of the chain to the recent record. To catch up with the current record of the original chain the calculation must be faster than that of the original chain. This means more computing power compared to the original chain is needed. In other words, more than half of the nodes need to cooperate for such an attack, accept the manipulated chain and claim that this is the correct chain.

In a dispute it is assumed that the majority of the nodes will have the correct chain. This means consensus of at least 51% of the nodes.

OBJECTS OF THE APPLICATION

The invention is a method to improve existing blockchain technology and change the way how the consistency of a blockchain is achieved.

A further feature is to provides a secure blockchain without the need for "Proof of Work".

A further feature is the elimination of the need for distributed nodes.

A further feature is the ability to provide physically small single chip blockchain solutions, including the ability to provide mobile blockchain solutions.

A further feature is to provide a secure blockchain, which can have a predefined maximum number of blocks.

A further feature is to provide a blockchain that can create a block within a defined number of operations, resulting in a defined response time for a block request.

A further feature is to provide a significantly higher speed capable to be implemented in a single electronic chip.

A further feature is to provide a blockchain, which can be integrated into other systems, sensors or other equipment close to or at the source of the payload data.

A further feature of the chain is to provide use as standalone system.

A further feature of the chain is to provide easy detection of forked chains.

A further feature is to provide a blockchain that allows to detect manipulation by the owner of the chain.

BRIEF DESCRIPTION OF THE DRAWINGS

Field that may contain a value  or contain other fields 

Function that may apply modification to a value  or 

Figure 2:
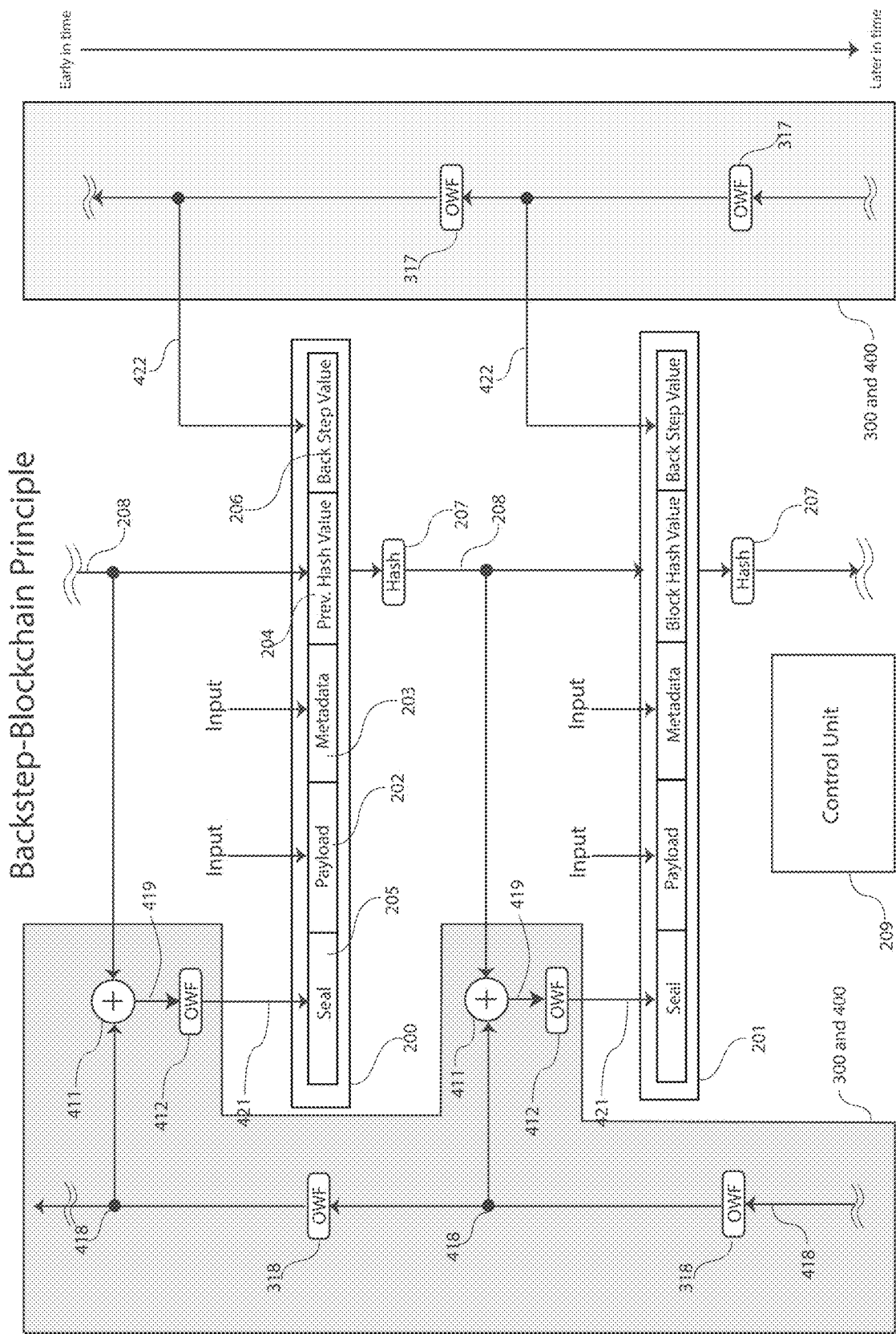

Object that comprises multiple fields, functions or other objects

An object may be a container that is detailed in a separate drawing 

Paths or signals that appear on multiple drawings use the numbering from the drawing where they originated or being driven.

Throughout this application BSB stands for Back-Step Blockchain.

FIG. 1 BSB Sample Application

The diagram shows one embodiment of the application as it may be used by financial institutions.

FIG. 1.1 Function Flow Overview

This diagram shows the functional blocks and their basic relations. It is used to explain the basic flow of operations.

FIG. 2 BSB Principle

The diagram shows the different elements of a block and the principle flow of information.

Figure 3:
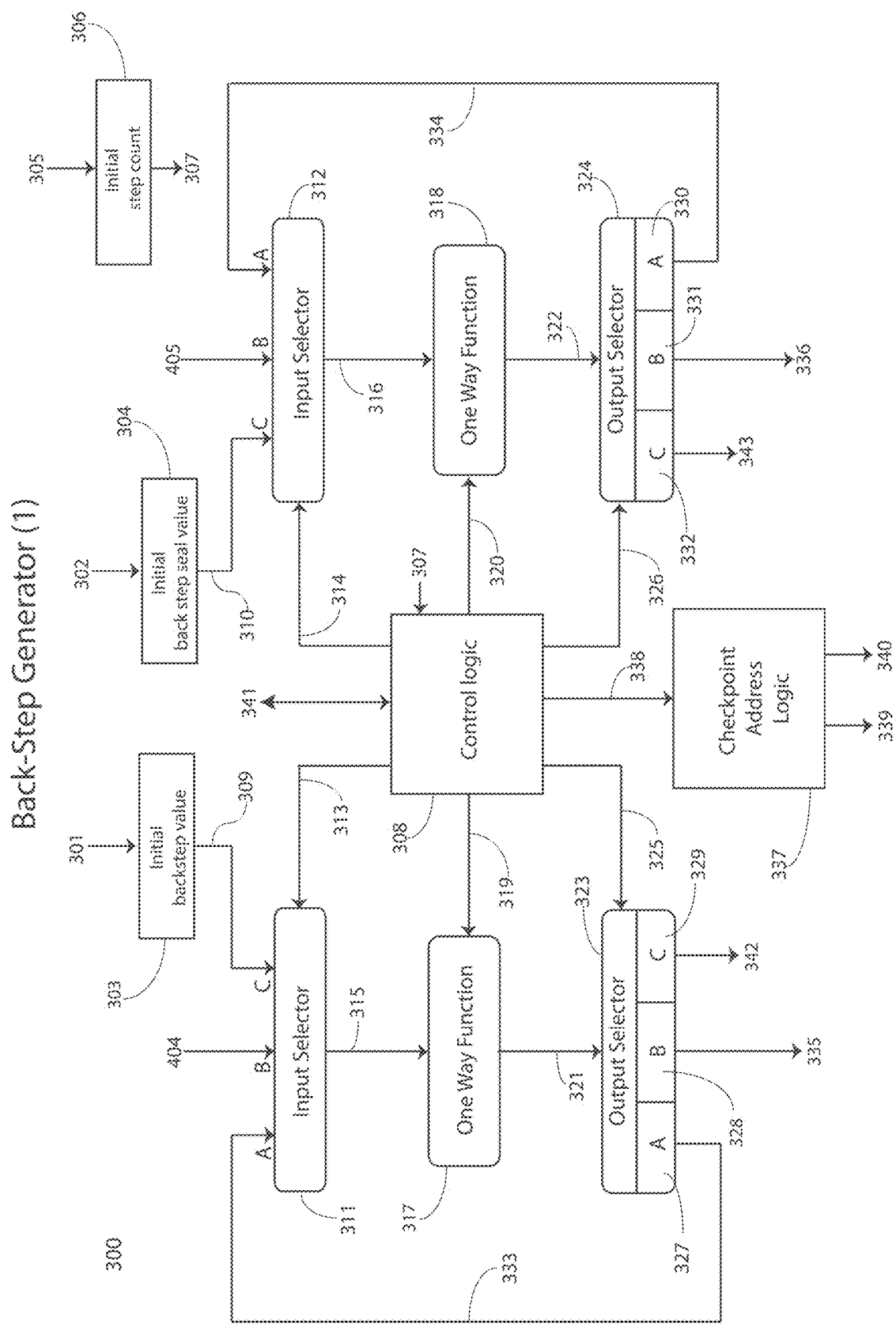

FIG. 3 Back-Step Generator

The generation of the backstep values and the seal values are shown.

Figure 4:
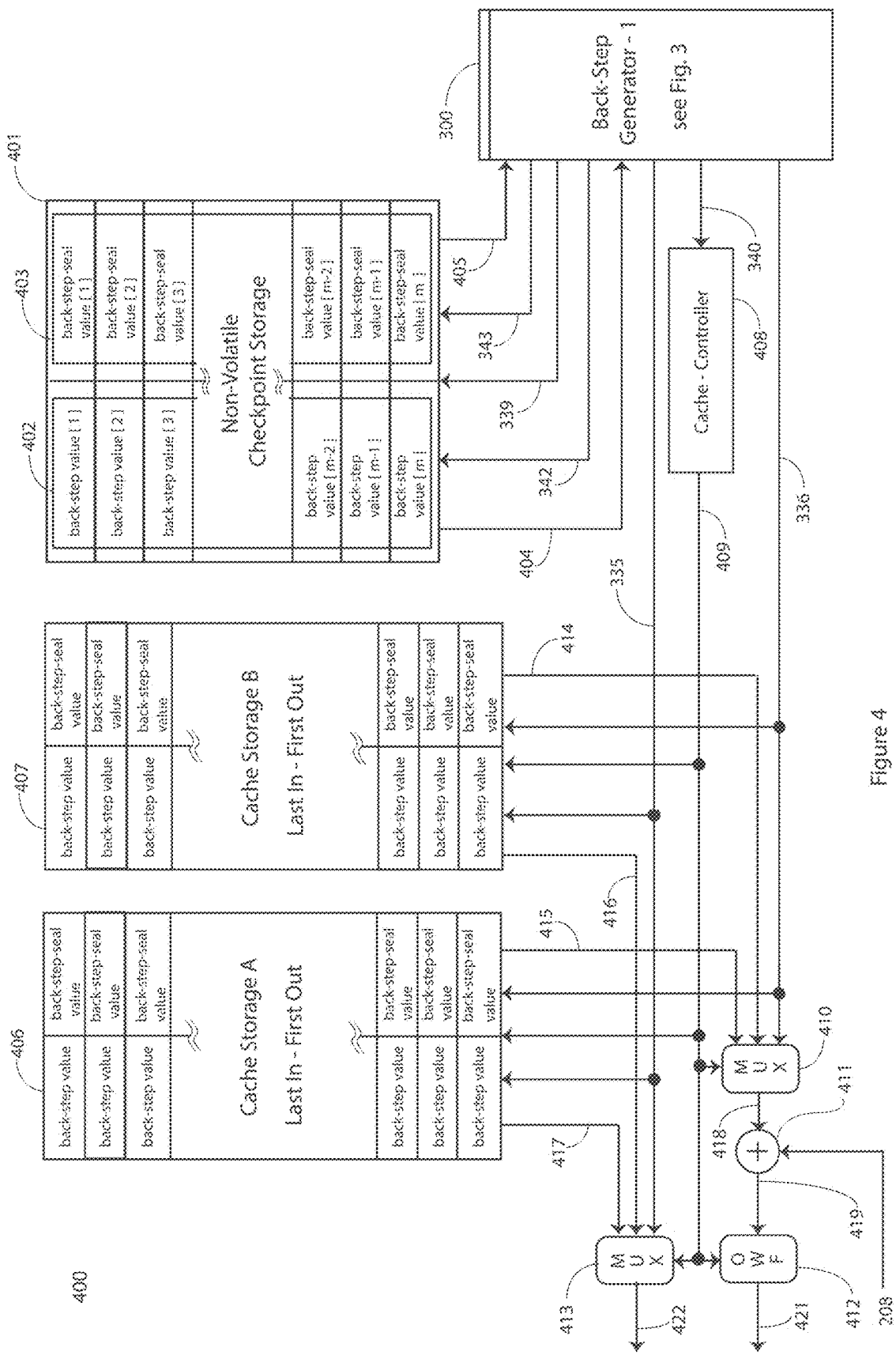

FIG. 4 Back-Step Generator—2

The figure shows how intermediate back-step values can be permanent or temporary stored to achieve the required performance.

Figure 5:
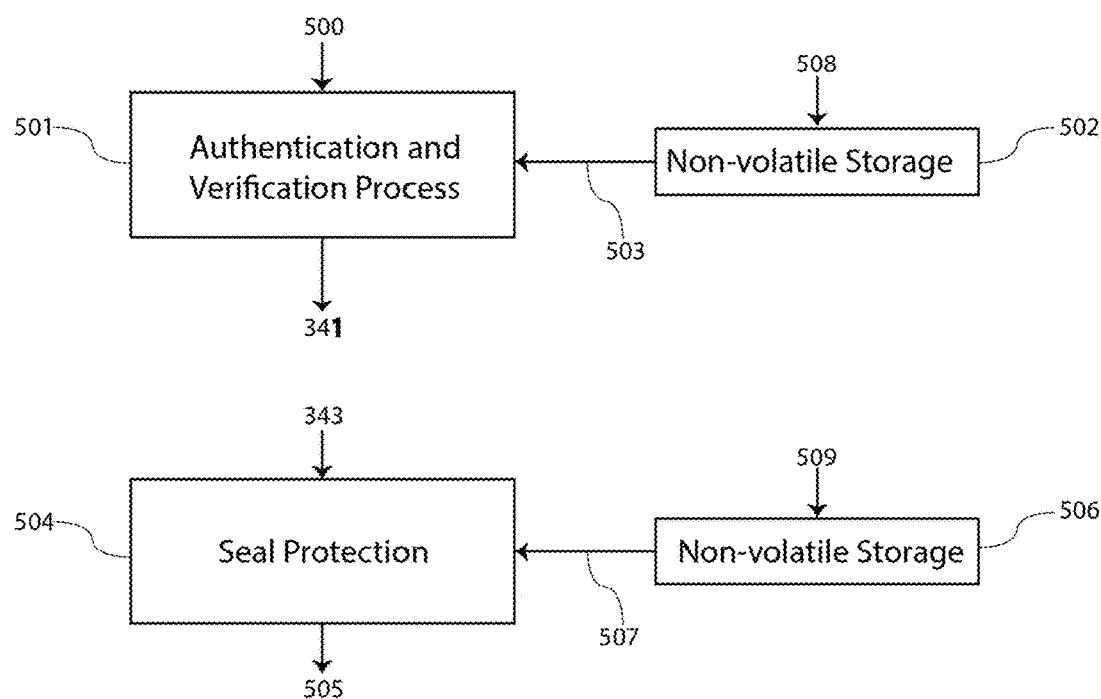

FIG. 5 Seal Value Delivery

The figure shows the delivery of seal values.

BRIEF DESCRIPTION

The application provides an alternate method to secure blockchains, which provide several advantages over existing blockchain technologies. BSB does not require a "Proof of Work" nor distributed networks, is fast and can be implemented in small silicon chips used in smart phones. The application allows a finite number of steps in a chain. The number of steps may be astronomical large and can be adjusted to the user's requirements. The key element of the application is the use of additional input values to the block, before the block is hashed. These values run from the future to the past. The values are called back-step value and back-step-seal value. The back-step value and the back-step seal value have one-way properties. Calculating from the value in the current block to any value of a previous block is easy, while calculating the value to be used in the next block is cryptographically hard, without knowing a secret. Two secret values, the initial back-step value and the in initial back-step seal value are used and must be kept secret in the chain system.

Verifying a BSB is easy by using two steps. First a repeated backward one-way calculation of the back-step value of the current block to all the previous blocks and second, a traditional forward hash verification from the first block up to the current block. Both calculations are operational cheap and fast. Of course, no secrets are required to verify the chain.

BSB may be used in single installations, where the blocks are not published. Beside others, examples are accounting systems for small companies. To prevent or detect manipulations for single systems by the chain owner/operator itself the application provides a seal, which is calculated from the back-step-seal value. To verify the correctness of single chains the application provides a function, which allows to release of previously used back-step seal values, except for the value used for the last calculated block. This function can be restricted to provide the back-step seal value only on request of authorities to verify the correct operation of the chain by the owner. Beside others, this function may support Fintech or government blockchain applications, like tax related accounting. The back-step-seal value itself is not part of the hashed block, but the seal is.

The BSB provides through its architecture, enhancements in speed, size and universal embodiment. Speed enhancements are essential for all applications, where a high number of blocks per time unit are required, like in bank and credit card transactions. The BSB uses backwards chaining, based on cryptographic functions to eliminate the "Proof of Work" or the requirement for large number of distributed nodes, known from traditional blockchains. Without "Proof of Work" a new block can be calculated in microseconds. This is required by financial institutions or data recording in machinery, where the number of transactions per second can be very high. An example implementation of the BSB method in an apparatus as small as a USB token can generate >1000 blocks in a second, at an example block size of 1024 byte. When thousand transactions are included in one block as in Bitcoin, a transaction rate of ~1 million transactions per second is possible. A further embodiment of the method is in a small silicon chip, which allows the use of a BSB in small devices like smartphones. This enables consumer applications, where everyone has its own blockchain. Beside others, this enables a new generation of trusted payment applications. A further embodiment of the BSB is the integration of the method into sensors of IoT systems, which can create the blocks at the source of the data. This includes the integration into Black Boxes, like flight recorders or other equipment. The number of embodiments is only limited by imagination.

An embodiment for securing transactions, including but not exclusive financial transactions is shown in FIG. 1. At a financial institution (10) a BSB is used for bank specific applications to secure the history of transactions. A data base system (11) stores the transaction data, which are to be inserted as payload into a block. The data base system (11) sends the payload to the BSB device (12), which has the BSB method implemented. After a new block is generated by (12), it is returned to the requesting system (11) and stored in the blockchain database file. The ongoing chain of new blocks may be distributed via a computer network to other nodes (13), which may store copies of the blockchain on their own computer database file (14). These distributed computers may at any time verify the consistency of the chain but are not needed for the block generation or for building the trust. In this embodiment the block is totally calculated and secured inside the hardware device (12).

Specific Description

The BSB supports a finite number of blocks. The maximum number of blocks may be defined as design parameter or as a configuration parameter, which is applied when the chain is initialized. The number of blocks is also called the steps of the chain. A BSB can have trillions of steps.

The BSB requires a secure area to keep the secrets private, which are required for the trusted operation. The BSB may be implemented in Software or Hardware or in a combination of both. It is the responsibility of the actual implementation to provide the required security. The implementation in Hardware implies the advantage that the required security for the secrets is easier to provide. The secrets are used in the back-step generator (103) shown in FIG. 1.1.

Beside the forward chaining of the blocks using a hash value, as known from a standard blockchain, the BSB comprises one or multiple chained field that propagate their values from the last block in a chain to the first block in a chain. The content of these fields run backwards from the future to the past. The calculation of these values is performed in the back-step generator 103. For longer chains and this is by far the regular case it may not be possible to store all the values in a secure area. For that reason, the BB may contain a logic to calculate and provide the values when they are needed.

Between two adjacent blocks holds the relation, that backward chained fields of a block are calculated from the values of the next block in time, by applying a cryptographic function with "one way" properties. The one-way function is implemented in the back-step generator 103. Between a current block and all previous blocks, the back-step values in the chain can be easy calculated and verified, but the reverse operation is cryptographically hard. The type of one-way function used is design dependent. A one-way function used needs to create a unique output from a unique input. The one-way function should have inputs and outputs of the same bit length. This can be achieved with a hash function or with a dedicated cryptographic one-way function. A one-way function usable for the BSB must provide the property that backward calculation is hard and not practical. Further it shall provide the property, that a single bit changes at the input changes every output bit with a probability of ~50%. It is required that brute force or other attacks are not feasible to succeed in the available time. Traditional forward chaining using a hash and backward chaining using a function with one-way property are combined in each block and provide the security of the chain.

Functional Overview

The BSB requires a set of basic functions to be operational. These functions are shown in FIG. 1.1. The BSB provides connections to the outside environment. These are external information processing units like, but not limited to, servers, computers, bank terminals, public terminals, personal electronic devices, smartphones, machinery and others. The blocks are stores at this outside environment, not inside the BSB. Therefore, the BSB comprises an input interfaces (101) and an output interface (106), where the calculated blocks are returned.

Processing a block needs the input to be sent to the block generation (105) via data path (108). Input data may be payload data, metadata, hash from the previous block and others, dependent on the actual use case and integration of the chain into the external system. Following the first block, continuing operation may store the hash of the previous block internally, so it may not to be needed to input. A non-volatile storage may be implemented to keep the previous hash during power off cycles. This is an implementation dependent option. A start command received via interface (101) and sent via path (107) may tell the control unit (102) to initiate the calculation of a new block. Payload and other required data provided by the external system are sent via path (108) to the block generation (105).

The control unit signals the block request to the back-step-generator (103) via path (109). The back-step-generator (103) communicates with the checkpoint and cache logic (104) to present required back-step-values to the block-generation (105) using path (111).

At that point the block is ready to be hashed. When the hash operation is completed the newly calculated block is passed to the output interface via path (112) and eventually stored in an optional temporary non-volatile storage. Storing of the blocks in a database is the responsibility of the outside systems and is out of the scope of this document.

Block Generation

The backstep-blockchain principle is shown in FIG. 2. This diagram represents the logical flow of the data directed by controller (209). Therefore, two blocks (200) and (201) out of a longer chain are presented. Physically (200) and (201) are the same entities, where (200) shows the state earlier in time and (201) later in time. Each block, (200) and (201) are shown as a logical field and comprised of multiple detailed fields. A block may contain among other application specific fields, a payload field (202), a metadata field (203), a previous hash value field (204) providing the forward chaining of the blocks, a seal field (205) and at least one back-step-value field (206). At least one forward chaining of the blocks is provided by the hash function (207). The forward chaining is created by calculating the hash value (208) over the complete fields of a block. The hash value (208) calculated of block (200) becomes the input value for field (204) of the next bock (201). The backstep value (422) can be calculated from an initial value inside the back-step generator detailed in diagram (300) and (400) all the way down to the current block, by repeated application of a one-way function (317). A Back-Step-Seal value (418) is similar created and used to create the seal value (421), which may be used to provide additional security of the chain against intentional manipulation by the owner/operator of the chain. Therefore, the back-step-seal value (418) of the current step is applied to a XOR function (411), together with the hash value (208) of the previous block and results in the value (419). This intermediate value is the input to the one-way function (412), which creates the seal value (421), which is placed into the block seal field (205). In cases where the block length of the forward hash is chosen to be larger than the block length of the one way function a subset of the hash result can be used as input to the function (411).

All data fields comprising the same block (200), (201) are logically adjacent but may or may not be physically adjacent, dependent on the implementation. The fields and functions shown in the greyed containers are explained in detail in the back-step generator section (300) and (400).

Everything required to build or provide the values (421) and (422) should be performed in a trusted area, where it is hard for unauthorized processes or people to capture or otherwise spy out any future value of the chain. FIG. 3 and FIG. 4 comprise the trusted area.

Protection Against Attacks

The mechanism of the BSB that provides security against forked chains is explained now. A forked chain has a manipulated content at one or multiple steps of the chain and is from that step on different to the original chain. Whenever a third party presents a chain and claims that its chain is the correct one, such a manipulated chain cannot calculate the next step, because the next back-step value can only be calculated by the original chain, which owns the backstep generator. By this mechanism the need for the "proof of work" or other time or computing intensive measures is unnecessary.

In addition, the protection provided by the seal value ensures that the owner/operator of the chain itself, which has access to the backstep generator, cannot manipulate the chain. Trusted authorities, which may receive the back-step-seal value of a specific block can verify the correctness of the chain backwards. Authorities will not have any information to be able to manipulate future blocks at all. Such an authority-based verification requires a secure channel to present the required back-step seal value to the authorities and only to the authorities.

Backstep Generator

The detailed description of the generation and the provision of the Back-Step values follows here with reference to FIG. 3 and FIG. 4.

The BSB can only function in real life and contribute its benefits, when the time from a block request to the block result is reasonably fast. Required speed for demanding applications is defined by the transactions per second during peak periods of usage. Current transaction rates may reach up to 20,000 transactions per second in Fintech applications.

This is beyond the speed of existing block chains. Therefor existing chains need to combine multiple transactions in a single block, to reduce the required block rate. The advantage of the BSB is that can provide such and even higher speeds without the need of multiple transactions in one block. This requires that the Back-Step value and the Back-Step-Seal value are precalculated and already available at the time of a block request.

A pre-calculation and cache system may be required to sustain full speed and to support long chains. The calculation of the back-step values is shown in FIG. 3 and the caching system is shown in FIG. 4.

Backstep Generator Initial Operation

The generation of back-step values and back-step-seal values comprises a repeated application of a function with one-way property as shown in FIG. 3. Both values use the same logical flow illustrated in FIG. 3 but must contain different initial values. Prior to the first use of the BSB the initial back-step-value (301) and the initial back-step-seal-value (302) must be generated and loaded into the corresponding non-volatile storage (303) and (304). Both values must be kept secret. The implementation of the BSB must ensure that both values do not have any algorithmic relation to each other, they should be independently random generated. The values (301) and (302) may be generated by the controller itself or by any other external trusted random source. These initial values must not be stored outside the BSB.

Processing the first block of a chain requires the back-step generator to cycle through all values backwards until the values for the first step are reached. This finite number of blocks/steps is a configuration parameter the controller (308) will need.

The number of steps (305) the chain shall provide may to be loaded into a non-volatile storage (306). This number can be loaded via an interface from the outside of the system or it can be a predefined value as part of the actual implementation. The controller (308) receives the output of storage (306) as value (307). For the first one-way calculation, the control logic selects inputs C via signal (313) and (314) of the input selector (311) and (312) respectively. The selected signals (315) and (316) are the input to the one-way function (317) and (318). The controller using path (319) and (320) starts and stops the operation of the one-way logic. The output of the one-way logic, path (321) and (322) are routed to output selector (323) and (324). Both selectors are switched to output A using the control path (325) and (326) from the control unit (308). The selectors output values (333) and (334) are connected to the input selectors port A. The controller selects input A for the following rounds of calculations. Now, these operations cycles for a defined number of steps.

Checkpoint Values

The intermediate values generated by the one-way loops may be by far too many to store them all in a storage of the BSB. Instead, after the predefined number of cycles, called steps-size, a value can be stored in a non-volatile storage 401, shown on FIG. 4, as so-called check-point value (342) and (343). For that purpose, the controller (308) enables at the output selectors (323) and (324) exit C (329) and (332) for path (342) and (342) in addition to exit A. Because the time required to store the values in a non-volatile storage may be larger than the one-way cycle time the exits C port (329) and (332) may be implemented as registers. This avoids stopping the one-way cycling for some time. Actual implementations depend on the timing behaviour of the used components, architecture and may vary. Therefore, this implementation represents the technical principle. A system may be switched off, or loose for other reason power. This may happen at initialization time or afterwards at normal operation. After restart the calculation of one-way values can start from the nearest checkpoint values and not necessarily from the initial values. That will save calculation time. A larger number of checkpoint values provides faster response but requires more storage. This is a trade-off between storage and time and is a design parameter for the BSB. During power on, the system must calculate from the nearest checkpoint to the next step that will be requested. This calculation takes time during each power on. The checkpoint-storage requires a checkpoint address logic (337), which manages the addresses for storing checkpoint values during initialization and for fetching values during normal operation. The checkpoint address logic (337) receives instructions and starting address values from the controller (308) and generates the write, read, addresses and all other required control signals on path (339) for the checkpoint-storage. The checkpoint address logic further manages the functions of the cache-controller (408) using signals on path (340).

Details of Checkpoint Storage

The checkpoint storage (401) is logically organized as a matrix of 2 columns (402), (403) and m rows. The bit width of a column must be large enough to hold a back-step values (335). The same applies for the column holding the back-step-seal values 336. The actual implementation may require these columns wider, if implementation specific control bits are required.

The checkpoint storage (401) needs the required number of rows to store all needed checkpoint values. The number m is defined by the finite number of blocks divided by the checkpoint step-size, which is defined as the number of steps between two adjacent checkpoints.

Checkpoint values to be stored are passed through the selectors (323) and (324), using exit C (329) and (332) on path (342) and (343) to the input of the checkpoint storage (401). The control signals to read, write and to define the actual address are originated at the checkpoint address logic using path (339).

When blocks are processed during normal blockchain operation the checkpoint values are essential to calculate the back-step values and back-step-seal values. To select the checkpoint values needed, the current step count number may be used to calculate the nearest checkpoint. The back-step value (404) and the back-step-seal value (405) on FIG. 4 are then loaded via the selector (311) and (312) as input (315) and (316) into the one-way functions (317) and (318). The generator cycles now in the already describe way, generating back-step values and back-step-seal values.

Backstep Cache

In high speed applications, where fast blockchain generation is needed, additional cache logic is required to provide the required speed.

The checkpoint storage provides back-step data that are required for future blocks. Starting from such a future value the data for the next blocks must then be calculated backwards. The results are used to constantly fill two alternating cache storages, which then deliver the actual values to the block calculation. The caches may be implemented in multiple levels. If the generation of back-step data is faster than the block generation rate a multi-level cache may be implemented to save storage requirements. Six levels of cache can provide >134 Million back-step and back-step seal values with just 32 Kbyte of random storage. FIG. 4 shows a single-level cache implementation.

The generator shown at FIG. 4 is used to fill two cache storages named Cache A and Cache B, (406) and (407). Each one of the cache storages has fields for the back-step value and the back-step-seal value. Output values using path (335) and (336) from the output selectors (323) and (324) of the generator (300) are connected to both caches. The cache used is selected by the cache controller (408). The caches are organized as First-In Last-Out storage. The corresponding addresses and the read/write control signals are generated by the cache controller (408) using path (409). The cache controller generates also the input signals for the output multiplexors (410), (412) and (413).

At the end of the initialization the checkpoint storage is loaded with its values. During operation the two cache storages perform alternating operations, while cache A provides values to the block calculation logic, cache B is loaded with the next values. When the last value from cache A is consumed the caches switch their role, Cache B provides values while cache A is loaded. This supports seamless block generation in high speed operations. In the rare case of slow speed operation, the caches can be bypassed using the multiplexors (413) and (410). During high speed operation these multiplexers alternate between cache A and cache B.

The multiplexer (413) provides the back-step value (420) to the block generation and uses during cache operation the input path (416) and (417) alternatively. The multiplexer (410) is responsible for selecting the back-step-seal value and uses during cache operation the input path (414) and (415) alternatively. In the cases where no cache is required multiplexer (413) selects path (335) for the back-step value and multiplexer (410) selects path (336) for the back-step-seal value.

The back-step-seal value selected by multiplexer (410) on path (418) is the input to the seal generation. The seal generation uses the XOR function (411) to combine a seal value on path (418) with a hash value from the previous block on path (208). The XOR result (419) is the input to another one-way function (412). This one-way function produces the seal on path (421) for the current block being processed.

Authority Verification

BSB provides two methods for CHAIN verification. First, one can easily follow the back-step blockchain backwards by calculating the one-way function over the back-step value from the current block to the first block in the chain. Then the hash from the first block to the current block can be calculated. If both, the backward and the forward calculation match, then the chain is consistent and not manipulated by third parties.

Second, a verification for authorities is provided. To ensure that the owner/operator of the BSB is not able to modify the chain an additional seal is used. The seal is a combination of forward and backward chaining and is inserted in the block. Even the owner of the BS chain, who holds the hardware cannot modify previous blocks undetected.

Seal verification requires the back-step seal value of a previous block. From that block on the chain can be verified in direction to the first block. The BSB does not release the back-step seal value of the current block, only for previous blocks and preferred only on request. For seal verifying of the chain by a third party, like government authorities or courts, the release of the back-step seal value for the block in question is required. The BSB provides the value (418) of the required step in encrypted form to the requestor via the interface.

A set of functions are provided to deliver a requested seal value when an authorized request is received. These functions may or may not be enabled during initial configuration. This is shown in FIG. 5. During initial configuration the non-volatile storage (502) is loaded with one or more authentication secrets (508), while the non-volatile storage (506) is loaded with one or more encryption secrets (509). A request (500) for a seal value of a defined block is provided from an external interface to controller (501). An authentication/verification process in (501) is used to decide if the request must be granted or not. The authentication process may use permanently stored authentication secrets (508). Existing challenge response or other authentication protocols may be used. The actual protocol is implementation dependent and outside of the scope of this document.

If the external request is granted an internal request using path (341) is provided to the control logic (308). The control logic (308) initiates the calculation of the requested back-step-seal value. It may use a checkpoint value or start the calculation from the initial value. As soon as the requested value is calculated path (343) is used to provide the value to the seal protection process (504). This process may encrypt the back-step seal value and may need a protection secret from storage (506). Such a secret is initially loaded through path (509) is provided to the protection unit (504) via path (507). The details of the protection and the eventual used encryption are implementation dependent. After the seal value is protected, the seal value is provided at an interface using path (505). External verification processes, which know the two involved one-way functions (317) and (318) can now verify the whole chain back to the first block and detect any modification applied.

The invention claimed is:

1. A method to enhance blockchains by securing the blockchain using backward chained one-way elements and reducing the required number of steps for a calculation of a trusted block to a single hash operation the method, comprising:
   providing additional fields in a block where additional values are inserted before the block is hashed whereby the additional fields are used to build a cryptographic backward chain from the block to its previous block, and from this previous block to its previous block and so on, until a first genesis block is reached providing cryptographic security to detect manipulated chains;
   providing and using the back step generator as secured logic providing the required additional values;
   providing and using a non-secret cryptographic one-way function for building the additional values embedded in the back step generator and logically applied between adjacent blocks, such that the values of the previous block can be easily calculated from a current block in the chain;
   providing and using a secured storage to hold values used as initial secrets for the generation of the back step value and the back step seal value;
   providing and using a logic as part of the back step generator to calculate a seal from a hash value of the previous block and the current back step seal value in such a way that a backward calculation to the back step seal value is cryptographically hard;
   providing a logic inside the back step generator to pre-calculate back step and back step seal values at product initialization time by repeated application of the one-way functions to the initial secrets;

providing and using a cache logic inside the back step generator that provides back step and back step seal values in time for the calculation of the block;

providing and using a controller logic and a checkpoint address logic to store such pre-calculated values periodically after a defined number of steps in a secured non-volatile storage as checkpoint values and to fetch them back whenever the cache needs to be refilled;

providing and using a cache controller to manage alternate refill and depletion of the two-cache storage blocks such that back step and back step seal values are immediately available whenever the next block needs to be hashed;

providing and using a logic inside the back step generator that calculates the seal from the back step seal value and the previous block hash value such that a reverse calculation of the back step seal value is cryptographically hard;

providing and using a logic to deliver the backstep seal value for a defined step of the chain to authorized people or institution for external verification of the correctness of the chain;

providing a non-volatile secure storage inside the back step generator for secrets used to verify the authenticity of a seal value delivery request;

providing a non-volatile secure storage for values used to protect the backstep seal value at delivery time;

and further, providing and using a seal protection logic to protect the backstep seal value against unauthorized use;

wherein the blockchain is secured by using backward chained one-way elements, and the number of steps for performing the calculation of a trusted block to a single hash operation are reduced.

2. The method according to claim 1 wherein the blockchain does not need a "proof of work" function to create trusted blocks.

3. The method according to claim 1, further comprising the additional steps of:

providing a back-step seal value;

and using a mathematical function to mathematically combine, the back-step seal value is mathematically combined with the hash value of the previous block;

and further, providing and using a cryptographic one-way function, whereby the result is protected against reverse calculation;

and inserting a calculated result in a field of the block, to thereby enable detection of manipulations of the blockchain.

4. The method according to claim 1, further comprising the step of calculating a defined fixed number of blocks, such that the chain has a predefined end.

5. The method according to claim 1, further comprising: performing one or more one-way functions;

and providing a set of multiplexers; and a control logic, such that back chained values are pre-calculated.

6. The method according to claim 1, further comprising: providing and using a non-volatile storage medium holding intermediate checkpoint values;

and providing and using a control logic to store and fetch these values whereby required calculation of back-step and back-step seal values can start at values that are nearest to the required step.

7. The method according to claim 6, further comprising: providing and using one or more volatile cache storage layers; a cache control logic; and a set of multiplexers, such that intermediate chain values can be precalculated and stored for fast access and use.

8. The method according to claim 7, wherein a second set of cache storage is provided, such that one cache is filled while the other cache is emptied.

9. The method according to claim 3, further comprising: performing an authentication function; and employing one or multiple authentication secrets: and a data protection function; and providing data protection secrets whereby an authenticated person, organization or process can request and receive back-step-seal values related to a requested block.

10. The method according to claim 1, wherein the number of operations to generate a block is fixed resulting in a fixed response time for real time back-step blockchain applications.

11. The method according to claim 1, performed in one or multiple integrated circuits.

12. The method according to claim 11, performed within one or more integrated circuits of a smartphone.

13. The method according to claim 11, performed within an apparatus where data are sensed and automatically inserted into the back step chain.

14. The method according to claim 11, performed within an apparatus where data are recorded.

15. The method according to claim 1, performed within an apparatus where instructions are executed and recorded.

16. The method according to claim 1, performed within a data processing system.

17. The method according to claim 1, performed within a data communication system.

18. The method according to claim 1 performed within a legal identity document.

19. The method according to claim 1, performed within a personalized payment device.

* * * * *